Figure 1:
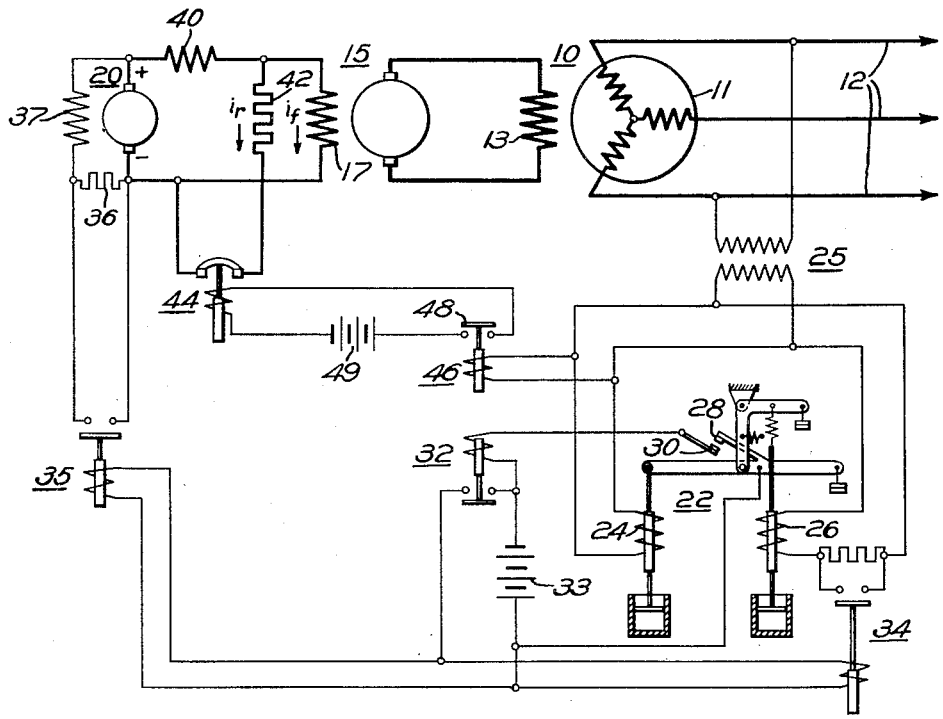

April 3, 1934.    C. L. FORTESCUE    1,953,106
REGULATING SYSTEM
Filed June 16, 1933

WITNESSES:
R. J. Fitzgerald
C. F. Bryant

INVENTOR
Charles L. Fortescue.
BY Franklin E. Hardy
ATTORNEY

Patented Apr. 3, 1934

1,953,106

UNITED STATES PATENT OFFICE 1,953,106

REGULATING SYSTEM

Charles L. Fortescue, East Liberty, Pa., assignor to Westinghouse Electric & Manufacturing Company, East Pittsburgh, Pa., a corporation of Pennsylvania Application June 16, 1933, Serial No. 676,132

8 Claims. (Cl. 171—119)

My invention relates to excitation supply systems for dynamo-electric machines and it has particular relation to means for enabling the machine excitation to be increased with exceedingly great rapidity.

In certain applications of dynamo-electric machines, particularly machines of the synchronous type which form a part of alternating-current power transmission systems in the operation of which the problem of maintaining stability is of importance, it is essential that the machine excitation supply system be capable of effecting exceedingly rapid increases in field winding current.

In such applications it is customary that automatic regulators be utilized to maintain constant a machine characteristic such, for example, as machine voltage. In all excitation-supply systems utilized in the past with which I am familiar, the rapidity of machine field current increase has been limited by the inductance characteristics of the field winding circuit and by the rate at which it has been possible to raise the excitation-supply voltage. My invention is directed to an improved method of attaining high rapidity in the building up of the excitation of dynamo electric machines which is not dominated by the above limitations.

One object of my invention is to provide means whereby the excitation of a dynamo-electric machine may be momentarily increased at a rate which is higher than that practically attainable heretofore.

Another object of my invention is to provide, in combination with an excitation supply system, inductive means whereby the energy stored in an auxiliary magnetic field may practically instantaneously be converted into increased field winding current.

A further object of my invention is to provide, in combination with a dynamo-electric machine, means whereby predeterminedly large deviations in a characteristic of the machine will make available the energy stored in the magnetic field of an auxiliary inductor for practically instantaneous conversion into machine exciting current.

In practicing my invention, I insert, in the direct-current excitation supply circuit of the machine to be benefitted, a device of relatively high inductance. During normal operation, an appreciable portion of the direct current passed through this inductor is diverted from the field winding by a shunt-connected impedance which is preferably in the form of a resistor. Upon a demand for a rapid increase in machine excitation, the circuit of this resistor is interrupted by suitable circuit-breaking means provided for that purpose. The stored energy in the magnetic field of the inductor which resulted from the by-passed or resistor current is now instantaneously made available for increasing the field winding current, which increase takes place at an exceedingly high rate. By properly proportioning the constants of the inductor and the resistor with respect to those of the machine field winding, I have discovered that increases of the order of several times the original value of field-winding current may, in this way, be effected.

Figure 2:
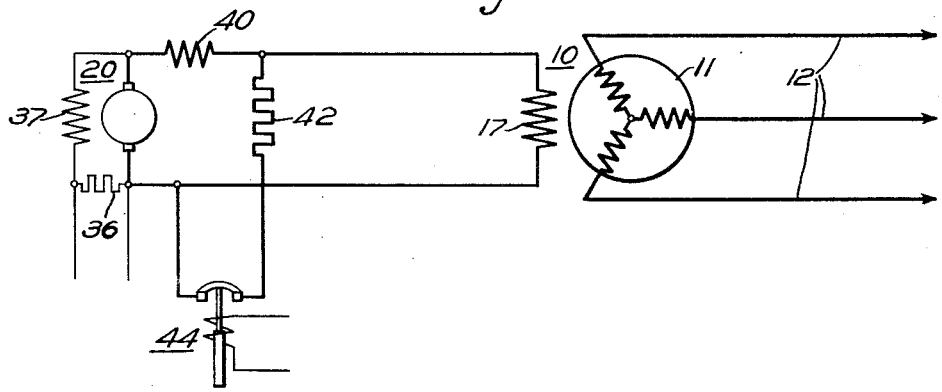

My invention will best be understood through the following description of a specific embodiment when taken in conjunction with the accompanying drawing, in which:

Figure 1 is a diagrammatic view of apparatus and circuits illustrating my invention applied to the excitation-supply system of a dynamo-electric machine of the synchronous type with which is associated an automatic voltage regulator, and Fig. 2 is a similar showing of my invention directly associated with the field winding circuit of the synchronous machine.

Referring to the drawing, and particularly to Fig. 1 thereof, I have represented at 10 a dynamo-electric machine having armature windings 11, which are directly connected with the conductors of an alternating-current circuit 12. The machine has an exciting field winding 13 which is directly connected with the armature winding of a direct-current exciting generator 15 which is provided with a field winding 17. To energize the winding 17 a suitable source of direct current potential of adjustable magnitude, represented in the form of a pilot exciter 20, is utilized.

For purposes of explanation, it may be assumed that machine 10 is a generator which, together with main exciter 15 and pilot exciter 20, is driven at substantially constant speed by suitable mechanical means (not shown).

In combination with the machine 10 and its excitation supply system, I have illustrated an automatic voltage regulator 22 which is disposed to adjust the voltage of the exciter 20 in a manner to maintain the voltage of synchronous machine 10 constant. The regulator shown is of a well known vibrating-contact type, it comprising a main control winding 24 directly influenced, through a suitable potential transformer 25, by the voltage of the machine circuit 12, and a vibrating element winding 26. These two windings are associated with a mechanism which carries a contact member 28 which, during the operation of the regulator, is continuously moved into and out of engagement with a cooperating stationary contact member 30. These contact members act to establish and interrupt an actuating circuit for a master relay 32, a battery 33 being shown as the source of energization for this circuit. The master relay 32, in turn, controls the actuation of a vibrating relay 34 and also that of a resistor-shunting relay 35 which is associated with a resistor 36 disposed in the circuit of the field winding 37 of the pilot exciter 20.

The regulator 22 possesses the characteristic, common to all vibrating-contact regulators, that the ratio of the time that the contact members are engaged to the time that they are disengaged during each cycle of vibration is a function of the magnitude of the voltage by which the regulator is influenced. Thus, in the particular arrangement illustrated, an increase in the voltage of the machine 10 above its desired value lowers this ratio and thereby causes the shunting relay 35, which is caused to open and close its contacts in accordance with the operation of the main regulator contacts, in well known manner, to increase the effective resistance of the resistor 36. This increase in effective resistance effects a lowering of the excitation of main exciter 15 which reduces the voltage of the machine 10 to the desired value.

In a similar manner, a decrease below the desired value of the voltage machine 10 raises the ratio of the time that the resistor 36 is short-circuited to the time that it is active in the field winding circuit of the pilot exciter with the result that the excitation of machine 10 is appropriately increased to raise the voltage back to the desired value.

The response-quickening means of my invention comprise, in the particular system illustrated, an auxiliary inductor 40 connected intermediate the pilot exciter 20 and the field winding 17 energized therefrom. This inductor may be of any suitable design capable of continuously carrying direct current and preferably, as will later be made more evident, should possess a value of inductance of a magnitude comparable to that possessed by the field winding in the supply circuit of which it is connected. To provide a by-path for a portion of the current passed through the inductor, an impedance, shown in the form of a resistor 42, is connected, through a suitable switching device 44, to parallel the field winding 17. Preferably this resistor should possess a value of resistance of the same general order as that possessed by the field winding 17, also for reasons to be more completely explained.

The switch 44 is of the normally-closed type and should be capable of satisfactorily interrupting, upon actuation, the current carried by the resistor 42. In the particular system illustrated, I have shown means for automatically controlling the actuation of switch 44 in response to predeterminedly large drops in the voltage of regulated machine 10. Such means comprise an undervoltage relay device 46, the operating winding of which is directly acted upon by the voltage of machine 10 supplied thereto through potential transformer 25.

As long as the machine voltage remains above a predetermined value, switch 44 will remain in the normally closed position shown. However, in the event that machine voltage is caused to drop to the value for which relay 46 may be set to actuate, this relay moves contact member 48 downwardly to complete an energizing circuit, from a battery 49, which effects a rapid opening of the switch 44. While switch 44 has been illustrated in a simplified form, it will be understood that in practice it may be of any well known circuit breaker construction which is capable of effecting a very rapid circuit interruption. In certain instances, also, it may be preferable to dispose the switch for manual operation.

As a result of the interruption of the current through resistor 42, which current together with that flowing through field winding 17 caused to be stored in the magnetic field of inductor 40 a substantial amount of energy, the energy previously accounted for by the resistor current, is instantaneously made available for increasing the current through the field winding 17, which increase in current takes place at an exceedingly rapid rate. The magnitude of this current increase may be made very substantial by a proper proportioning of the characteristics of the inductor 40 and the resistor 42, with respect to the field winding 17.

The opening of switch 44 does not change the total amount of magnetic energy which is jointly associated with inductor 40 and the field winding 17, but the excess energy in the inductor 40 is dissipated in the field-winding circuit causing an increase in current through the winding 17. Hence, the field winding current immediately increases to a value which depends, as before explained, upon the constants of the elements in question.

By way of analyzing what takes place let it be assumed that when the switch 44 is closed a current $i_r$ flows through resistor 42 and a current $i_t$ flows through field winding 17. The total current supplied through the inductor 40 is then $i_r + i_t$. Upon the opening of switch 44 the field winding current rises from the original value $i_t$ to a higher value I.

To determine what this higher value is, the total magnetic energy produced by the inductor 40 and the field winding 17 before the opening of switch 44 may be equated to the total magnetic energy distributed between these two devices after the switch has been opened. For purposes of such equation it will be assumed that inductor 40 possesses an inductance $L_k$, and that the inductance of field winding 17 is of a value designated by $L_f$.

The energy in joules stored in the magnetic field of an electrical winding having an inductance of L henries, through which winding a unidirectional current of $i$ amperes flows, is given by the well known expression:

$$W = \tfrac{1}{2} L i^2.$$

To express that the energy in the magnetic field of inductance 40 plus that associated with the field winding 17 when the switch 44 is closed is equal to the magnetic energy of the inductor 40 plus that of the winding 17 after the switch has been opened, the following equation, based on the fundamental expression for magnetic energy above given, may be set up:

$$\tfrac{1}{2} L_k (i_r + i_f)^2 + \tfrac{1}{2} L_f i_f^2 = \tfrac{1}{2} L_k I^2 + \tfrac{1}{2} L_f I^2.$$

Assuming that the constants of the devices in question are such that the current $i_r$ through the resistor 42 is equal to the current $i_t$ through the field winding 17 and that the inductance $L_k$ of inductor 40 is equal to twice that of winding 17 or to 2 $L_f$, a solution of the above equation for the higher value of field current I which obtains immediately after the switch 44 has been opened, reveals that $$I = 1.73\ if$$

In other words, when the characteristics of the devices are as assumed, an opening of the switch effects an immediate increase of 73% in the field winding current.

An analysis thus reveals that the possibilities for excitation increase possessed by the system of my invention are very great and, hence, that in many applications in which the importance of rapid building up of excitation is paramount, the system of my invention is particularly valuable.

It will be understood that, insofar as the operation of the system of my invention is concerned, the field winding in the energizing circuit of which the auxiliary inductor 40 is disposed may, as shown in Fig. 2, be that of the regulated machine 10 instead of forming a part of the interposed exciting machine 15. While, in such a case, the sizes of the inductor 40, the resistor 42 and the switch 44 would, of course, need to be increased in order to accommodate the higher values of current required by the field winding 13 of the main machine 10, the response would, however, be even more rapid since the lagging characteristics of the interposed main exciter 15, comprised by the system of Fig. 1, would be eliminated.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In combination with an electrical winding and a circuit for supplying a unidirectional energizing current thereto, inductive means, capable of storing considerable energy in the magnetic field produced thereby, disposed intermediate the circuit and the winding, an impedor connected in shunt relation with the winding to also draw a current through said inductive means, and means for interrupting the circuit of said impedor, such interruption allowing the energy stored in the magnetic field of said inductive means by virtue of the impedor current to produce a rapid rise in the electrical winding current.

2. In combination with an electrical winding and a direct-current circuit for effecting an energization of the winding, an inductor, capable of storing considerable energy in the magnetic field produced by the passage of a current therethrough, disposed intermediate the circuit and the winding, an impedor connected to also draw a current through said inductor, and a switch for interrupting the circuit of said impedor to render available, for rapidly increasing the winding current, the energy stored in the magnetic field of said inductor by virtue of the impedor current.

3. Means for rapidly increasing the current supplied from a direct-current source to an electrical winding comprising an inductor disposed intermediate said source and the winding, a by-pass circuit disposed in shunt relation with the winding, and circuit-breaking means for interrupting said by-pass circuit when it is desired to effect an increase in winding current.

4. In combination, a dynamo-electric machine having a field winding, a circuit for supplying unidirectional energizing current to said winding, a device having inductive characteristics disposed intermediate said circuit and the winding, an impedance connected in shunt relation with the winding, and means for interrupting the circuit of said impedance.

5. In combination with a dynamo-electric machine having a field winding, a source of direct-current energization, a circuit connecting the winding with said source, an inductor disposed in said circuit, a resistor disposed to shunt away from the field winding a portion of the current supplied thereto through the inductor, and a switch for interrupting the circuit of said resistor when it is desired to rapidly increase the field winding current.

6. In an excitation-supply system for a dynamo-electric machine, the combination of an inductor disposed to carry the machine-exciting current, an impedor disposed to shunt away from the machine a portion of said current, and means for interrupting the circuit of said impedor when it is desired to effect a rapid increase in the exciting current supplied to the machine.

7. In combination, a dynamo-electric machine having a field winding, a circuit for supplying unidirectional energizing current to said winding, regulating means for adjusting the magnitude of said current in response to changes in a characteristic of said machine, an inductor disposed intermediate said supply circuit and the winding, a by-pass circuit disposed in shunt relation with the winding, a switch for interrupting said by-pass circuit to thereby effect a rapid increase in winding current, and means responsive to predeterminedly large changes in said machine characteristic for effecting the actuation of said switch.

8. In combination with an automatic regulating system for a dynamo-electric machine having a field winding and a circuit for supplying unidirectional energizing current to said winding, an inductance device disposed intermediate said supply circuit and the winding, an impedance device disposed in shunt relation with the winding, a normally-closed switching device disposed in the circuit of said impedance device, and means responsive to a predeterminedly large decrease below a desired value in the voltage of said machine for effecting an opening of said switching device.

CHARLES L. FORTESCUE.